March 29, 1927.
C. F. RUBSAM
1,622,846
VEHICLE WHEEL
Original Filed Feb. 12, 1926
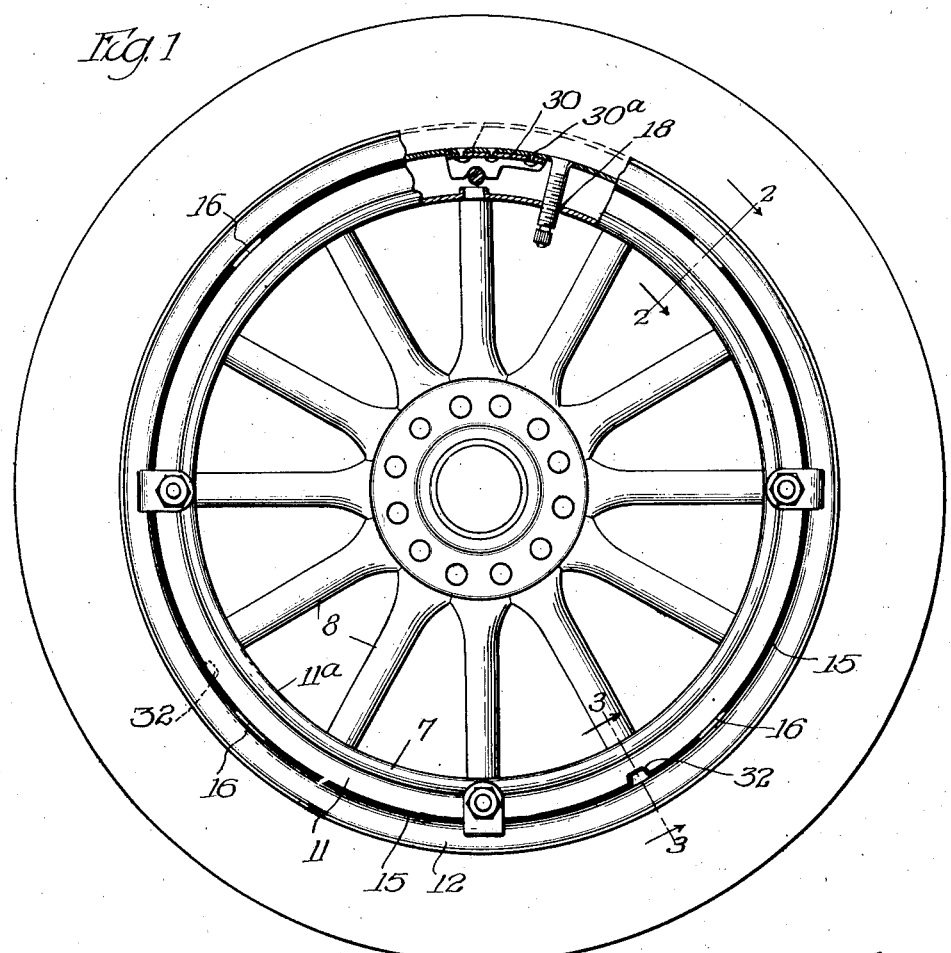
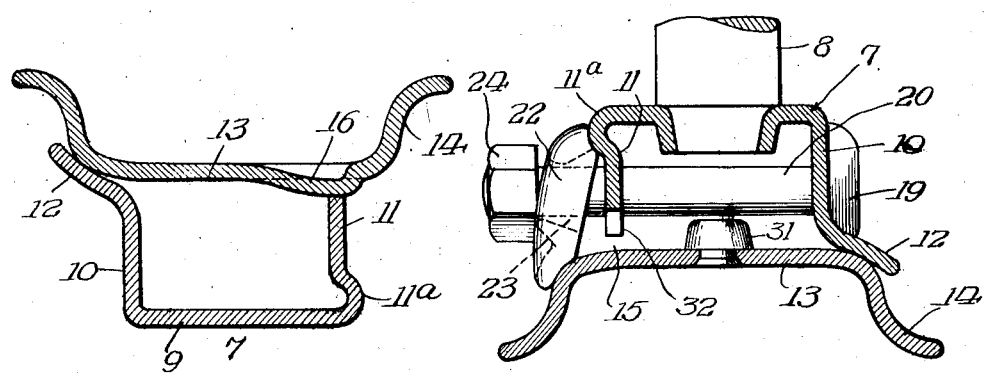
Inventor
Charles F. Rubsam
By Fred Gerlach Atty Patented Mar. 29, 1927.

1,622,846

UNITED STATES PATENT OFFICE.

CHARLES F. RUBSAM, OF JACKSON, MICHIGAN, ASSIGNOR TO RUBSAM CORPORATION, OF JACKSON, MICHIGAN, A CORPORATION OF DELAWARE.

VEHICLE WHEEL.

Application filed February 12, 1926, Serial No. 87,734. Renewed February 1, 1927.

The invention relates to vehicle wheels and more particularly to that type, which is provided with a metallic channel-shaped fixed rim, and is adapted to carry a demountable tire-carrying rim, in which the latter is provided with indentations in its base for engaging one of the flanges of the fixed rim to center and support the demountable rim, as exemplified in Letters Patent No. 1,576,226, granted to me March 9, 1926.

In the practice of the invention set forth in said patent, it has been found that the user, in placement of the demountable rim, is likely to reversely apply the demountable rim, so that the indentations will be disposed at the inner side of the fixed rim where the flared annular flange is disposed. When that occurs, the indented portions will engage the flared flange at the inner side of the fixed rim and prevent the rim from being properly seated thereon, and will also leave the outer side of the demountable rim unsupported by the indented portions.

The object of the present invention is to provide means for making it impossible to reversely place the demountable rim on the fixed rim, so that the correct placement of the indented portions will be insured. This result is accomplished by providing means which will prevent the demountable rim from being placed on the fixed rim, except when the indented portions are at the outer side of the fixed rim.

The invention consists in the several novel features hereinafter set forth and more particularly defined by claims at the conclusion hereof.

In the drawings: Fig. 1 is a side elevation of a wheel embodying the invention. Fig. 2 is a transverse section on line 2—2 of Fig. 1. Fig. 3 is a section on line 3—3 of Fig. 1.

The invention is exemplified in a wheel body composed of a channel fixed rim 7 and spokes 8 secured therein in any suitable manner. Said rim is formed of a single sheet of metal in the form of an annular channel with a transverse base 9 and integral radial side flanges 10 and 11. Side flange 10 terminates in a flared rim-receiving flange 12 which is disposed at the vehicle or inner side of the wheel to form an annular seat for one side of the inner periphery of a demountable rim of conventional cross-sectional shape. The latter comprises a base 13 and integral tire retaining flanges 14 which may be shaped for any type of tire. The outer flange 11 of the fixed rim is annularly bulged, as at 11$^a$. The outer periphery of flange 11 is concentric and is less in diameter than the adjacent inner periphery of the base of the demountable rim to leave sufficient clearance for easy placement and removal of the demountable rim. Four radial inward indentations 16 are integrally formed in the base 13 of the demountable rim and are arcuate and of limited length to leave circumferential clearances between them and the periphery of the flange 11 which substantially corresponds in diameter to the inner periphery of the indented portions 16. The radius of the inner periphery of the indented portions is substantially the same as the outer radius of flange 11. These indented portions are adapted to contact with the periphery of flange 11 when the demountable rim is applied to the fixed rim, and function to position and hold the demountable rim concentrically around the wheel-body while the lugs are being tightened and while tight. As a result, the demountable rim will take a true position on the flange 12, so that it will engage the same substantially throughout its entire periphery, and this has been found necessary to effectively avoid squeaks and to avoid working of the rim which will tend to loosen it. The contiguous surfaces of the indented portions 16 and the outer periphery of flange 11 are substantially parallel to the wheel-axis. These indented portions 16 contact with the periphery of flange 11 to position and support the demountable rim, and the clearances 15 between these supports are left to permit the easy appliance and removal of the demountable rim from the fixed rim by transverse tilting, while the usual tire valve on the demountable rim is in the usual hole 18 in the base of the fixed rim.

Any desired number of attaching or clamping devices are provided at points circumferentially between the supports 16. These devices together with the indented portions 16 are adapted to support the demountable rim at its outer side. Thus the demountable rim will be supported at one side by the flange 12 and at the other side by the clamping devices and indented portions. Each clamping device comprises a bolt having a head 19 engaging the outer side of flange 10; a shank 20 extending through aligned holes in flanges 10 and 11; a lug 22, which has a hole 23 through which shank 20 passes; and a nut 24 threaded to the shank for securing the lug 22 in its operative position.

The demountable rim shown is of the transversely split type with its ends fixed together by a locking plate 30, which is riveted to one rim end, as at 30ª, and removably secured to the other, as well understood in the art.

When the demountable rim is to be placed upon the wheel body, the latter is usually rotated to bring the bolt adjacent the hole 18 for the tire valve to the top; the demountable rim is then tilted transversely to bring the tire valve substantially into vertical alignment with hole 18, and the rim is then dropped until the valve has entered said hole and the driving plate is in its operative position. The lower portion of the demountable rim is then swung inwardly and substantially into alignment with the fixed rim; next, the lugs 22 are applied and all the nuts are tightened until all the lugs are firmly clamped into their operative positions. The demountable rim is removed by the reverse manipulation.

When the demountable rim, in being placed on the fixed rim of the wheel body, has been swung into approximate alignment therewith, the arcuate supports 16 will center the demountable rim around the outer periphery of flange 11 under the necessary commercial variations. When the first of the lugs 22 is tightened, it will tend to force the demountable rim so the inner side thereof will ride upwardly on the flared flange 12 and out of concentric position, but this will be prevented by the support 16 which is approximately diametrically opposite the outer periphery of flange 11. The same thing occurs when the remaining lugs are tightened. As a result, the demountable rim will be concentrically and accurately positioned on the flared flange 12 of the fixed rim, so that when the wheel is subjected to heavy stresses, there will be no relatively tight and loose portions between the flared flange and the demountable rim. When the latter occurs, squeaks result and cause working or grinding between the demountable rim and the flared flange.

A stud 31, fixed on the rim-base, projects inwardly from the central portion of the base of the demountable rim, and is adapted to pass through a notch 32 formed in the flange 11 of the fixed rim when the demountable rim is placed around the fixed rim with the supports 16 at the outer side of the demountable rim, so they will be positioned to coact with the outer periphery of flange 11 of the fixed rim when the demountable rim reaches its operative position. This notch 32 is placed at one side of the point which is diametrically opposite the hole 18 for the tire valve, so that the stud 31 will register with it and pass therethrough only when the demountable rim is turned for correct application to the fixed rim, that is, with the supports 16 at the outer side of the vehicle or fixed rim. If the user should attempt to reversely apply the demountable rim to the wheel with the supports 16 at the inner side of the rim, and the tire valve aligned with hole 18, the stud 31 would not register with the notch 32, as shown by dotted line in Fig. 1, and would strike the outer side of flange 11, because it would then be disposed at the opposite side of the point diametrically opposite said hole. This will cause the rim to be arrested so far outwardly that the lugs 22 could not be applied to the bolts, and the user would immediately see the incorrectness of the position of the demountable rim. This exemplifies simple means for preventing misplacement of the demountable rim of the type described, and insures the proper placement of the demountable rim on the fixed rim. By preventing misplacement of the demountable rim, the locking plate 30 will always be placed into driving relation with one of the bolts 20.

The invention is not to be understood as restricted to the details set forth, since these may be modified within the scope of the appended claims, without departing from the spirit and scope of the invention.

Having thus described the invention, what I claim as new and desire to secure by Letters Patent, is:

1. In a vehicle wheel, the combination of a fixed channel shaped rim, an integral flange on the outer side, a demountable rim provided with inwardly projecting supports of limited length and adapted to engage the outer periphery of said flange on the fixed rim and leaving circumferential clearances between them, removable clamping devices arranged circumferentially between said supports, the fixed rim being provided with a hole for a tire-valve, and means for preventing the demountable rim from being placed on the fixed rim when the supports on the demountable rim are on the inner or vehicle side thereof to prevent misplacement of the demountable rim.

2. In a vehicle wheel, the combination of a fixed channel shaped rim provided with an annular integral flange on the inner side thereof having a flared portion and an integral flange on the outer side, a demountable rim provided with indented supports of limited length and adapted to engage the outer periphery of the flange on the outer side of the fixed rim and having circumferential clearances between them, removable devices arranged circumferentially between the supports, the fixed rim being provided with a hole for a tire-valve, and a notch in its outer flange out of diametric alignment with said hole, and a stud on the demountable rim adapted to pass through said notch when the supports are on the outer side and to prevent it from being placed on the fixed rim when the supports are on the inner or vehicle side thereof.

3. In a vehicle wheel, the combination of a fixed channel shaped rim having a flared flange forming an annular seat at its inner side and an outer integral side flange, a demountable rim provided with integral inwardly projecting means for engaging the periphery of the outer flange, the demountable rim with said means being adapted to be reversely slipped over the outer flange of the fixed rim so that said means, unless otherwise restricted, would prevent annular seating of the rim on the flared flange of the fixed rim, removable clamping devices for securing the demountable rim on the fixed rim, the fixed rim being provided with a hole for a tire valve, and means for restricting the inward movement of the demountable rim while it is reversed so that the misplacement will be obvious.

Signed at Chicago, Illinois, this 5th day of February, 1926.

CHARLES F. RUBSAM.